United States Patent
Clauson

(10) Patent No.: US 6,932,416 B2
(45) Date of Patent: Aug. 23, 2005

(54) VEHICULAR DOOR TRIM HAVING A MOLDED-IN SUBSTRATE FASTENER

(75) Inventor: Mitchell D. Clauson, Sterling Heights, MI (US)

(73) Assignee: Lear Corporation, Southfield, MI (US)

( * ) Notice: Subject to any disclaimer, the term of this patent is extended or adjusted under 35 U.S.C. 154(b) by 68 days.

(21) Appl. No.: 10/248,334

(22) Filed: Jan. 9, 2003

(65) Prior Publication Data

US 2004/0135394 A1 Jul. 15, 2004

(51) Int. Cl.⁷ ................................................ B60J 5/00
(52) U.S. Cl. .................................................. 296/146.7
(58) Field of Search .......................... 296/146.7, 147.8; 49/502; 24/297, 289

(56) References Cited

U.S. PATENT DOCUMENTS

| | | | |
|---|---|---|---|
| 4,398,984 A | * | 8/1983 | Uchiyama et al. .......... 156/196 |
| 5,186,509 A | | 2/1993 | Tyves |
| 5,202,172 A | | 4/1993 | Graf |
| 5,229,175 A | | 7/1993 | Seabolt |
| 5,345,721 A | * | 9/1994 | Stein et al. ............... 296/146.7 |
| 5,667,868 A | | 9/1997 | Freeman |
| 5,716,161 A | | 2/1998 | Moore et al. |
| 5,805,402 A | | 9/1998 | Maue et al. |
| 5,913,762 A | | 6/1999 | Matsumoto |
| 6,095,594 A | * | 8/2000 | Riddle et al. ............... 296/191 |
| 6,364,589 B1 | | 4/2002 | Wenglinski |
| 6,378,931 B1 | * | 4/2002 | Kolluri et al. .......... 296/146.15 |

* cited by examiner

Primary Examiner—Lori L. Coletta
(74) Attorney, Agent, or Firm—Bill C. Panagos

(57) ABSTRACT

A vehicular door trim member (14) for attachment to an inner door (12) of a vehicle is provided. The vehicular door trim member (14) is defined by a rigid sheet (16) with one or more resilient clip fasteners (24) extending therefrom. These resilient clip fasteners (24) and the rigid sheet (16) comprise an integral one-piece molded construction. Moreover, these resilient clip fasteners (24) are intended to be inserted into apertures (22) formed within the inner door (12) for the purpose of attaching the vehicular door trim member (14) to the door (12).

12 Claims, 5 Drawing Sheets

VEHICULAR DOOR TRIM HAVING A MOLDED-IN SUBSTRATE FASTENER

BACKGROUND OF INVENTION

The present invention relates generally to door assemblies of automotive vehicles, and more particularly to a door trim member that decreases the manufacturing cycle time of door assemblies and the costs associated therewith.

Door assemblies of automotive vehicles are well known. These door assemblies typically include one or more door panels that are attached to a door. Specifically, the door panels and the door usually have a series of holes formed therein that are intended to receive a series of retaining fasteners.

Typical manufacture of these door assemblies requires that a substantial number of the retaining fasteners are first inserted into the holes formed within the door panel so as to attach the fasteners to that door panel. Subsequently, each door panel is aligned with its respective door such that the retaining fasteners on the door panel are aligned with the holes formed in the door. Thereafter, these retaining fasteners are inserted into those holes and fixedly coupled to the door. As a result, the door panel is fixedly attached to the door.

A drawback of these door assemblies is that the use of a substantial number of retaining fasteners and the insertion of each of those fasteners into the holes collectively increase the manufacturing cycle time, as well as the costs associated therewith.

Therefore, a need exists for a door trim member having a construction that decreases the manufacturing cycle time of door assemblies as well as the costs associated therewith.

SUMMARY OF INVENTION

The present invention provides a vehicular door trim member for attachment to an inner door of a vehicle. The vehicular door trim member is defined by a rigid sheet with one or more resilient clip fasteners extending therefrom. These resilient clip fasteners and the rigid sheet comprise an integral one-piece construction. Moreover, these resilient clip fasteners are intended to be inserted into respective apertures formed within the door for the purpose of attaching the vehicular door trim member to the door.

One advantage of the present invention is the provision of a vehicular door trim member having resilient clip fasteners integrally formed therein, which decreases the manufacturing cycle time and the costs associated therewith.

Another advantage of the present invention is the provision of a vehicular door trim member having fasteners with tapered tip portions integrally formed therein, which further decreases the requirement for precise tooling coordination thereby further decreasing the manufacturing cycle time and the costs associated therewith.

Other advantages of the present invention will become apparent when viewed in light of the detailed description of the preferred embodiment when taken in conjunction with the attached drawings and appended claims.

BRIEF DESCRIPTION OF DRAWINGS

For a more complete understanding of this invention, reference should now be made to the embodiments illustrated in greater detail in the accompanying drawings and described below by way of examples of the invention.

DETAILED DESCRIPTION

Figure 1:
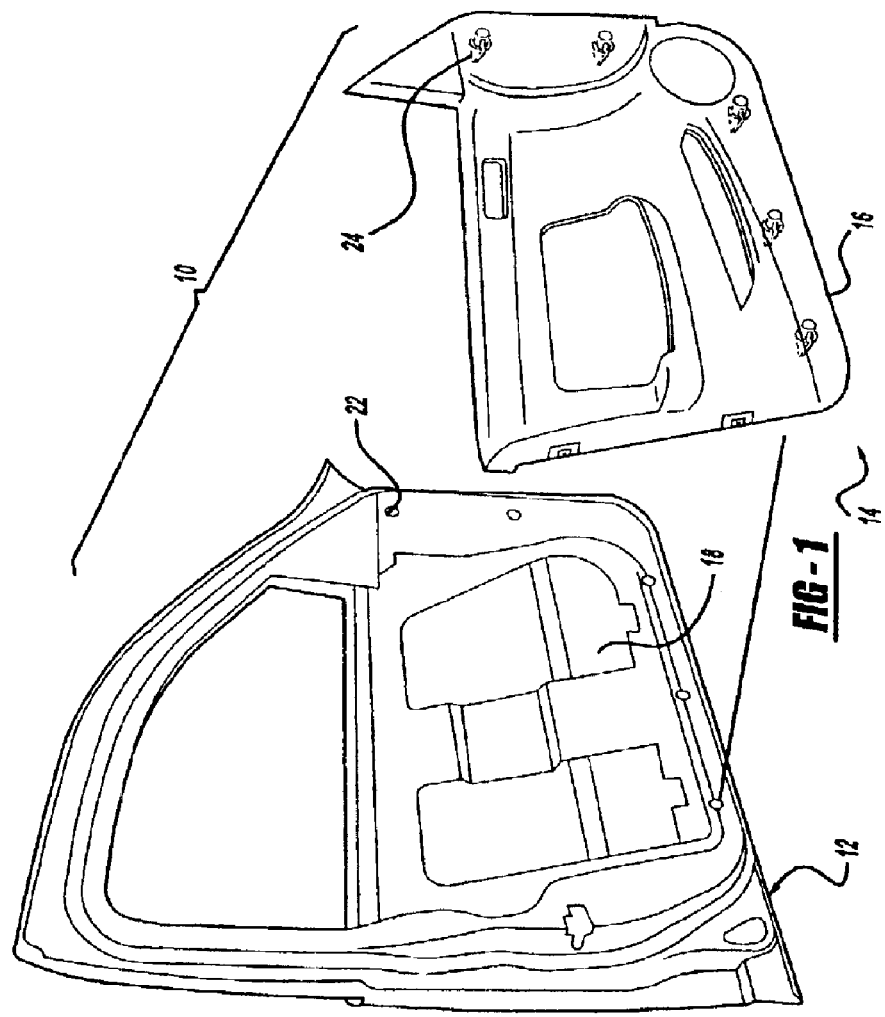
FIG. 1 is an exploded perspective view of a vehicular door assembly, in accordance with one embodiment of the present invention.

In the following figures, the same reference numerals are used to identify the same components in the various views. The present invention is particularly suited for a door trim member of a vehicular door. However, it is understood that the present invention may be suited for various other components within the door.

Figure 2:
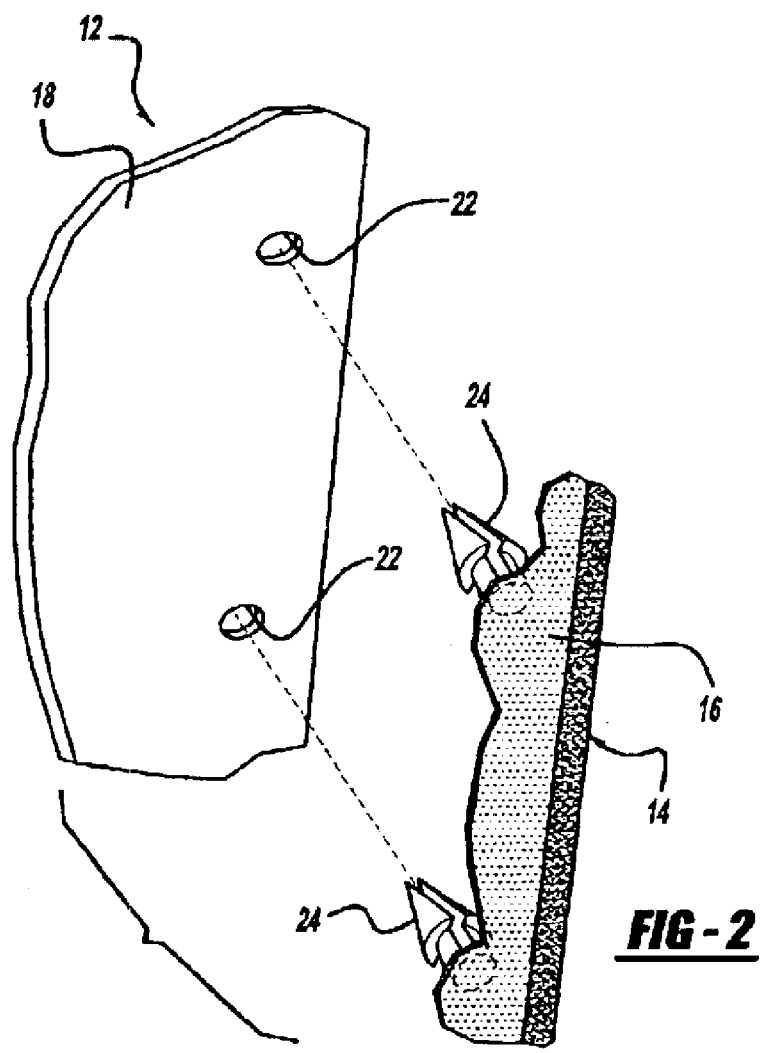
FIG. 2 is a partially cutaway view of the vehicular door assembly shown in FIG. 1.
Figure 3:
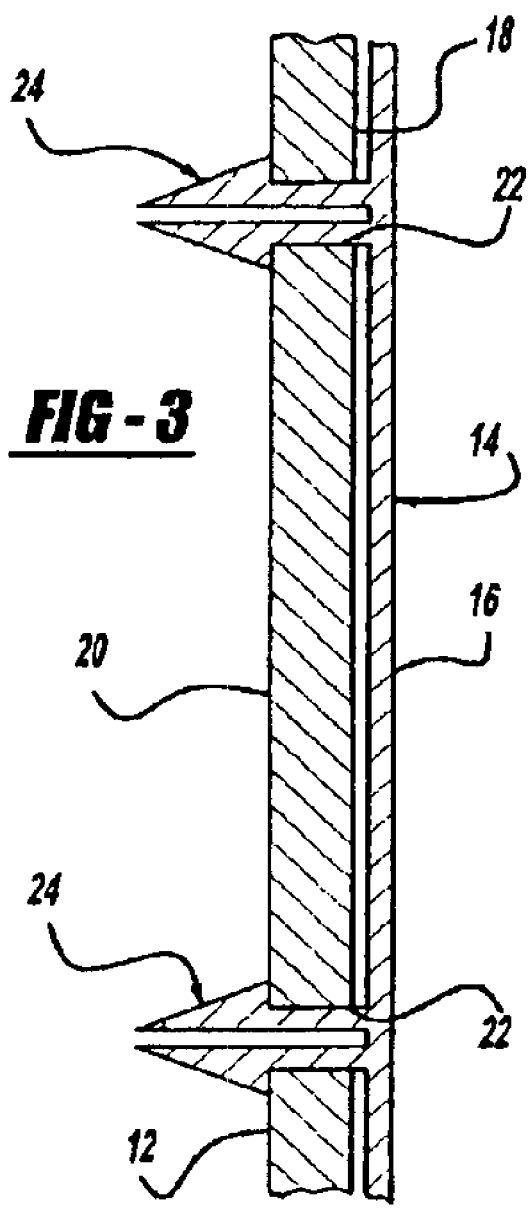
FIG. 3 is a cross-sectional view of the vehicular door assembly shown in FIG. 2.

Referring to FIGS. 1–3, there is shown an exploded view a vehicular door assembly 10 according to one embodiment of the invention. The door assembly 10 includes an inner door 12 and a door trim member 14 for attachment to the inner door 12. The door trim member 14 is defined by a rigid sheet 16 of molded material. In one embodiment, this door trim member 14 is a door trim pad that is injection molded. However, it is understood that the rigid sheet 16 can be a variety of other suitable door trim members that are formed by compression molding, casting, or various other suitable manufacturing processes. Moreover, the rigid sheet 16 can also form a housing for various devices for integration within the inner door 12.

Figure 4:
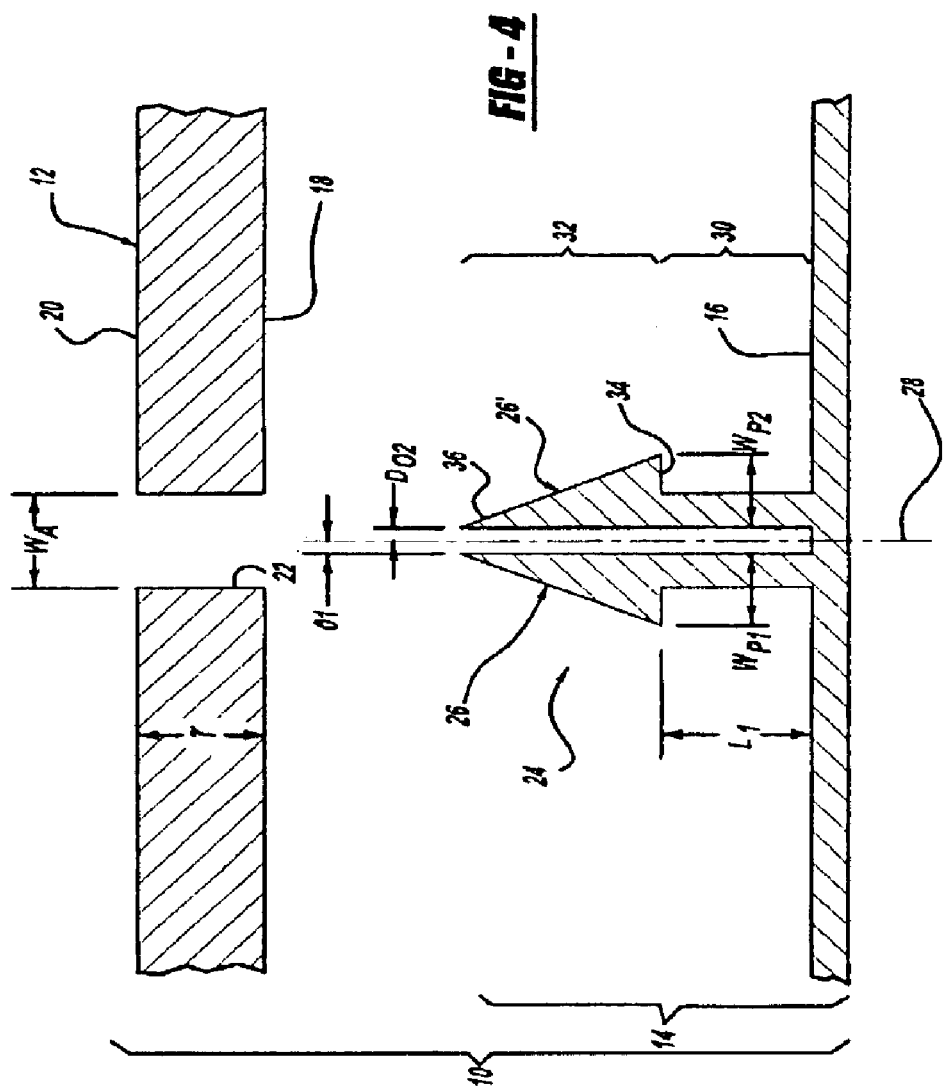
FIG. 4 is an enlarged cross-sectional view of the vehicular door assembly shown in FIG. 3, depicting the structure of a resilient clip fastener and an aperture of the assembly.
Figure 5:
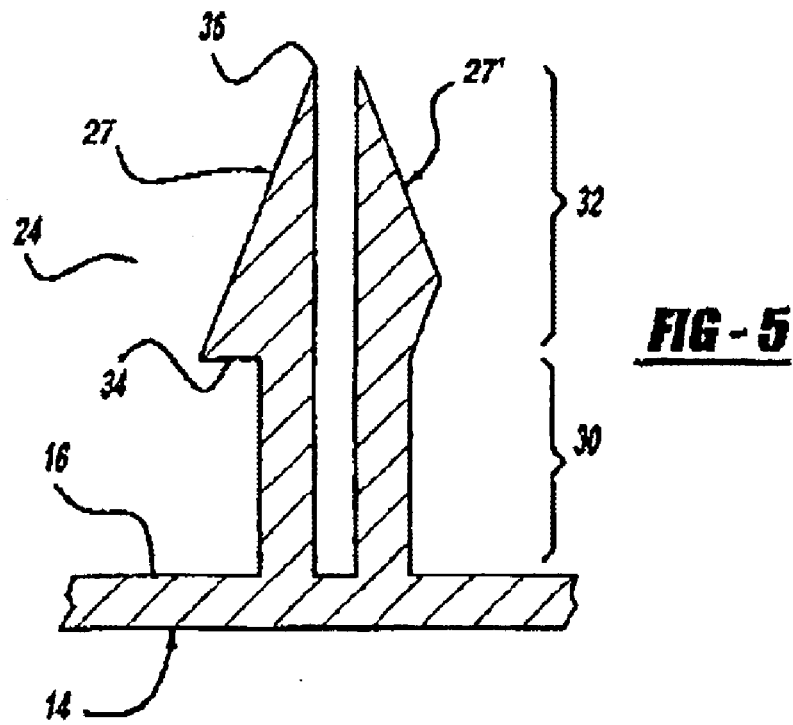
FIG. 5 is a cross-sectional view of a resilient clip fastener, in accordance with another embodiment of the present invention.

The inner door 12 has an interior surface 18 directed toward the passenger cabin of the vehicle and an exterior surface 20 (as shown in FIGS. 3 and 4) positioned opposite to the interior surface 18. The inner door 12 is comprised of sheet metal. However, it is understood that the inner door may be comprised of various other suitable materials as desired. This inner door 12 has a series of apertures 22 formed therein extending between its interior surface 18 and its exterior surface 20. These apertures 22 are intended to receive one or more resilient clip fasteners 24 extending from the door trim member 14 for the purpose of attaching the door trim member 14 to the interior surface 18 of the inner door 12. The resilient clip fasteners 24 are detailed in the description for FIGS. 4 and 5.

Although FIG. 1 illustrates five apertures 22 and five resilient clip fasteners 24, it is understood that more or less than five of each can be utilized as desired. In addition, notwithstanding the illustration of circular apertures 22 in FIG. 2, it is understood that these apertures may instead be oval, polygon, or various other suitable shapes.

Referring now to FIG. 4, there is shown an enlarged and exploded cross-sectional view of the inner door 12 and the door trim member 14 with one of the resilient clip fasteners 24 extending therefrom.

Each resilient clip fastener 24 includes two or more protrusions 26, 26' extending from the door trim member 14 with a centerline 28 located between the protrusions 26, 26'. Each protrusion 26, 26' includes a resilient extension portion 30 extending from the door trim member 14 and a tip portion 32 extending from the resilient extension portion 30. The resilient extension portions 30 are intended to allow the protrusions 26, 26' to bend toward the centerline 28 so as to permit the resilient clip fastener 24 to pass through the aperture 22. Furthermore, once the tip portion 32 is passed through the aperture 22, the resilient extension portions 30 are intended to bend the protrusions 26, 26' away from the centerline so as to engage the tip portions 32 to the inner door 12.

These tip portions 32 each include a fastening end 34 that is located adjacent to the resilient extension portion 30 and a locating end 36 that is positioned distal to the fastening end 34. Specifically, the tip portions are semi-conical and taper in thickness from the fastening end 34 to the locating end 36. However, it is understood that the tip portions can have various suitable shapes other than semi-conical as desired.

The locating ends 36 of the protrusions 26, 26' are substantially narrow and proximal to the centerline 28 for the purpose of facilitating insertion of the resilient clip fastener 24 into the aperture 22. The locating ends 36 allow the resilient clip fastener 24 to be inserted into the aperture 22 without first having to align the centerline 28 of the fastener 24 with the center of the aperture 22.

Moreover, the fastening ends 34 of the tip portions 32 are intended to engage the exterior surface 20 of the inner door 12 so as to fixedly attach the door trim member 14 to the inner door 12. This engagement is caused by the resilient extension portions 30 forcing the tip portions 32 laterally outward after the tip portions 32 have passed through the aperture 22.

The resilient clip fastener 24 and the aperture 22 are sized according to particular equations or relationships that exist between the two constructions for the purpose of accomplishing a snap-fit engagement therebetween.

Specifically, the aperture 22 has a minimum width ($W_A$) that is greater than the sum of the maximum offset distances ($D_{O1}$, $D_{O2}$). This relationship is intended to allow the entire resilient clip fastener 24 to be inserted into the aperture 22. The offset distances ($D_{O1}$, $D_{O2}$) are the distances between the locating end 36 of each protrusion 26, 26' and the centerline 28. This relationship is shown by the following equation:

$$W_A > D_{O1} + D_{O2}$$

Furthermore, the minimum width ($W_A$) of the aperture 22 also is greater than the sum of the maximum lateral widths ($W_{P1}$, $W_{P2}$) of the protrusions 26, 26'. This relationship is demonstrated by the following equation:

$$W_A > W_{P1} + W_{P2}$$

This construction is beneficial because it allows the fastener 24 to be sized sufficiently small for passing through the aperture 22 as the inner door 12 forces the protrusions 26, 26' laterally against each other toward the centerline 28.

Moreover, the minimum width ($W_A$) of the aperture 22 is less than the sum of the maximum offset distances ($D_{O1}$, $D_{O2}$) and the maximum lateral widths ($W_{P1}$, $W_{P2}$). This relationship allows the resilient clip fastener 24 to contact the inner door 12 and engage its exterior surface 20. This relationship is exemplified by the following equation:

$$W_A < D_{O1} + D_{O2} + W_{P1} + W_{P2}$$

Additionally, each resilient extension portion 30 of the protrusions 26, 26' has a length ($L_1$) that is greater than the thickness (T) of the inner door 12. This construction allows the fastening ends 34 of the protrusions 26, 26' to slide across the exterior surface 20 of the inner door 12 laterally outward from the centerline 28. As a result, the fastening ends 34 of the fastener 24 engage the inner door 12 so as to secure the door trim member 14 to the inner door 12. This straightforward relationship is demonstrated by the following equation:

$$L > T$$

Although FIG. 4 illustrates the protrusions 26, 26' having similar structures, it is also understood that one protrusion 26 can have a different structure than another protrusion 26'. For instance, regarding the embodiment shown in FIG. 5, one protrusion 26' can have a tip portion 24 including a first end 27, which is adjacent to the resilient extension portion 30, and a second end 27', which is distal to the first end 27. This tip portion 32 can taper in thickness from a middle section 27" toward the first end 27 and the second end 27'. In this embodiment, only one protrusion 26 has a tip portion 32 with a fastening end 34. One skilled in the art will understand that a resilient clip fastener 24, which has only one protrusion 26 with a fastening end 34, allows the door trim member 14 to be more easily removed from the inner door 12 than a resilient clip fastener, which has two protrusions both with fastening ends. For that reason, access to the internal parts of the vehicular door assembly 10 is improved. This feature can facilitate the maintenance, the repair, or the replacement of various components within the vehicular door assembly 1, as well as the door trim member 14 itself. Additionally, it is understood that more than two protrusions 26, 26' maybe utilized as desired.

The door trim member 14 with the resilient clip fasteners 24 integrated therein allows for relatively quick and simple attachment of the door trim member 14 to the inner door 12. Specifically, the one-piece construction eliminates the need to fasten a substantial number of separate individual fasteners to the door trim member 14. The door assembly can be assembled by merely aligning the locating ends 36 of the resilient clip fasteners 24 with the apertures 22 formed in the inner door 12.

Moreover, the door trim member 14 can be removed from the door 12 by first forcing the protrusions 26, 26' toward the centerline 28 and positioning the fastening ends 34 of the resilient clip fastener 24 within the width of the aperture 22. Thereafter, the door trim member 14 can be pulled away from the inner door 12 and detached therefrom. A simple tool, e.g. a screwdriver, can be utilized to force the protrusions 26, 26' together and remove the door trim member 14 from the inner door 12.

Figure 6:
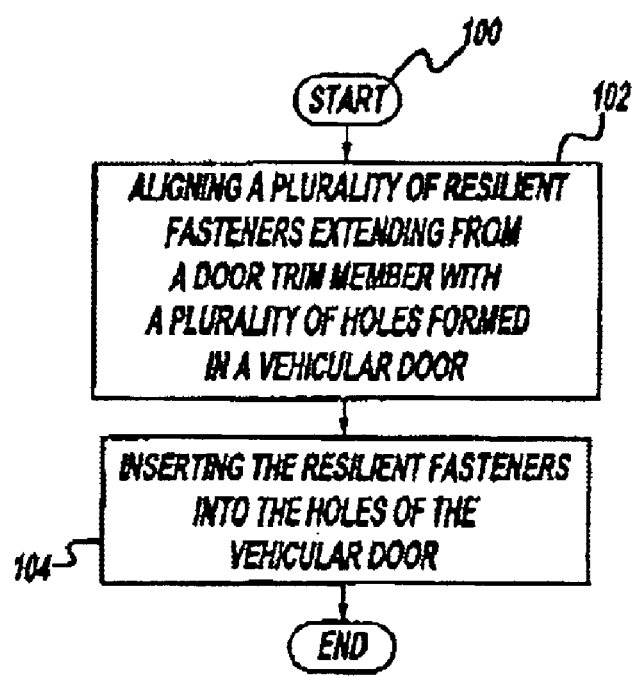
FIG. 6 is a logic flow diagram representing a method for manufacturing a vehicular door assembly, in accordance with one embodiment of the invention.

Referring now to FIG. 6, there is shown a logic flow diagram representing a method for manufacturing the door assembly 10, according to one embodiment of the present invention. The method commences in step 100 and immediately proceeds to step 102.

In step 102, the door trim member 14 is aligned with the inner door 12 so as to align the locating ends 36 of each fastener 24 in the respective apertures 22 formed within the inner door 12. However, it is also understood that the inner door 12 can instead be aligned with the door trim member as desired. This step is accomplished by a motorized device that is controlled by a controller. Alternatively, this step can also be accomplished manually by an individual. After the door trim member 14 is aligned with the inner door 12, the sequence proceeds to step 104.

In step 104, the door trim member 14 is forced against the inner door 12 so as to insert the resilient clip fasteners 24 into the respective apertures 22 within the inner door 12. In so doing, the inner door 12 bends the protrusions 26, 26' of each fastener 24 toward the centerline 28. As the tip portions 32 of the fasteners 24 completely pass through the apertures 22, the resilient extension portions 30 cause the fastening ends 34 to slide across the exterior surface 20 of the inner door 12 and engage those ends 34 to that surface 20.

While particular embodiments of the invention have been shown and described, numerous variations and alternate embodiments will occur to those skilled in the art. Accordingly, it is intended that the invention be limited only in terms of the appended claims.

What is claimed is:

1. A method for assembling a vehicular door assembly comprising:
    aligning at least one resilient clip fastener of a rigid sheet with at least one aperture of the door; and
    inserting said at least one resilient clip fastener into said at least one aperture;
    wherein said rigid sheet and said at least one resilient fastener form a one-piece construction;
    wherein each of said at least one resilient clip fastener is a pair of protrusions for insertion into one aperture formed in the door;
    wherein at least one of said pair of protrusions has a semi-conical tip portion.

2. The method of claim 1 wherein inserting said at least one resilient clip fastener into said at least one aperture comprises:
    inserting a pair of protrusions into one aperture; and
    coupling a fastening end of at least one of said pair of protrusions to the door.

3. A vehicular door trim member for attachment to a door of a vehicle, comprising:
    a rigid sheet defining the vehicular door trim member; and
    at least one resilient dip fastener extending from said rigid sheet and intended to be inserted into at least one aperture formed within the door so as to couple the vehicular door trim member to the door;
    wherein said rigid sheet and said at least one resilient fastener form a one-piece construction;
    wherein each of said at least one resilient clip fastener is a pair of protrusions for insertion into one aperture formed in the door;
    wherein at least one of said pair of protrusions has a semi-conical tip portion.

4. The vehicular door trim member of claim 3 wherein at least one of said pair of protrusions comprises:
    a resilient extension portion extending from said rigid sheet and capable of bending toward a centerline positioned between said pair of protrusions; and
    a tip portion extending from said resilient extension portion, said tip portion having a fastening end that is proximal to said resilient extension portion and a locating end that is distal to said fastening end, said tip portion tapering in thickness toward said centerline substantially from said fastening end to said locating end.

5. The vehicular door trim member of claim 3 wherein one of said pair of protrusions comprises:
    a resilient extension portion extending from said rigid sheet and capable of bending toward a centerline positioned between said pair of protrusions; and
    a tip portion extending from said resilient extension portion, said tip portion having a first end that is proximal to said resilient extension portion and a second end that is distal to said first end, said tip portion tapering in thickness from a middle section to both said first end and said second end.

6. The vehicular door trim member of claim 3 wherein each one of said pair of protrusions has a maximum lateral width, said aperture having a minimum aperture width that is greater than the sum of said maximum lateral width of each one of said pair of protrusions.

7. The vehicular door trim member of claim 3 wherein a tip portion of each one of said pair of protrusions is positioned at a maximum offset distance from a centerline, said minimum aperture width being greater than the sum of said maximum offset distance.

8. A vehicular door assembly comprising:
    a door having an interior surface and an outer surface with at least one aperture extending from said interior surface to said outer surface;
    a rigid sheet defining a vehicular door trim member having; and
    at least one resilient clip fastener extending from said rigid sheet and intended to be inserted into said at least one aperture within said door so as to couple said vehicular door trim member to said door;
    wherein said rigid sheet and said at least one resilient fastener form a one-piece construction;
    wherein each of said at least one resilient clip fastener is a pair of protrusions for insertion into one aperture formed in the door;
    wherein at least one of said pair of protrusions has a semi-conical tip portion.

9. The vehicular door trim member of claim 8 wherein at least one of said pair of protrusions comprises:
    a resilient extension portion extending from said rigid sheet and capable of bending toward a centerline disposed between said pair of protrusions; and
    a tip portion extending from said resilient extension portion, said tip portion having a fastening end that is proximal to said resilient extension portion and a locating end that is distal to said fastening end, said tip portion tapering in thickness toward said centerline substantially from said fastening end to said locating end.

10. The vehicular door trim member of claim 8 wherein one of said pair of protrusions comprises:
    a resilient extension portion extending from said rigid sheet and capable of bending toward a centerline disposed between said pair of protrusions; and
    a tip portion extending from said resilient extension portion, said tip portion having a first end that is proximal to said resilient extension portion and a second end that is distal to said first end, said tip portion tapering in thickness from a middle section to both said first end and said second end.

11. The vehicular door trim member of claim 8 wherein each one of said pair of protrusions has a maximum lateral width, said aperture having a minimum aperture width that is greater than the sum of said maximum lateral width of each one of said pair of protrusions.

12. The vehicular door trim member of claim 8 wherein each of said pair of protrusions has a tip portion that is positioned at a maximum offset distance from a centerline disposed between said pair of protrusions, said minimum aperture width being greater than the sum of said maximum offset distance.

* * * * *

UNITED STATES PATENT AND TRADEMARK OFFICE
CERTIFICATE OF CORRECTION

PATENT NO. : 6,932,416 B2 Page 1 of 1
DATED : August 23, 2005
INVENTOR(S) : Clauson It is certified that error appears in the above-identified patent and that said Letters Patent is hereby corrected as shown below:

Column 5,
Line 38, replace "dip fastener" with -- clip fastener --.

Column 6,
Line 19, replace "trim member having; and" with -- trim member; and --.

Signed and Sealed this

Fifteenth Day of November, 2005

JON W. DUDAS
*Director of the United States Patent and Trademark Office*